United States Patent
Luo et al.

(10) Patent No.: US 11,340,996 B2
(45) Date of Patent: May 24, 2022

(54) AUTOMATED DISCOVERY OF DATABASES

(71) Applicant: Rubrik, Inc., Palo Alto, CA (US)

(72) Inventors: Kevin Rui Luo, Fremont, CA (US); Deepti Kochar, San Francisco, CA (US); Anshul Mohan Gupta, Sunnyvale, CA (US)

(73) Assignee: RUBRIK, INC., Palo Alto, CA (US)

( * ) Notice: Subject to any disclaimer, the term of this patent is extended or adjusted under 35 U.S.C. 154(b) by 298 days.

(21) Appl. No.: 16/728,428

(22) Filed: Dec. 27, 2019

(65) Prior Publication Data

US 2021/0200645 A1    Jul. 1, 2021

(51) Int. Cl.
| | |
|---|---|
| *G06F 12/00* | (2006.01) |
| *G06F 11/14* | (2006.01) |
| *G06F 9/38* | (2018.01) |
| *G06F 16/907* | (2019.01) |
| *G06F 3/06* | (2006.01) |

(52) U.S. Cl.
CPC ......... *G06F 11/1464* (2013.01); *G06F 3/065* (2013.01); *G06F 9/3891* (2013.01); *G06F 11/1448* (2013.01); *G06F 16/907* (2019.01)

(58) Field of Classification Search
CPC ............ G06F 11/1464; G06F 11/1448; G06F 16/907; G06F 9/3891; G06F 3/065; G06F 3/0683; G06F 3/0685; G06F 3/0689
See application file for complete search history.

(56) References Cited

U.S. PATENT DOCUMENTS

| | | |
|---|---|---|
| 2006/0101340 A1 | 5/2006 | Sridhar et al. |
| 2016/0188898 A1 | 6/2016 | Karinta et al. |
| 2017/0206199 A1 | 7/2017 | Umamageswaran et al. |
| 2017/0366624 A1* | 12/2017 | Tsang .................... G06F 16/278 |
| 2020/0042395 A1 | 2/2020 | Chu et al. |
| 2020/0264957 A1* | 8/2020 | Bajaj ................... G06F 11/2097 |
| 2021/0200643 A1 | 7/2021 | Luo et al. |
| 2021/0200779 A1 | 7/2021 | Luo et al. |

OTHER PUBLICATIONS

"U.S. Appl. No. 16/728,458, Non Final Office Action dated Dec. 15, 2021", 13 pgs.

(Continued)

*Primary Examiner* — Shawn X Gu
(74) *Attorney, Agent, or Firm* — Schwegman Lundberg & Woessner, P.A.

(57) ABSTRACT

In some examples, a networked computing system comprises a backup node cluster of a backup service in communication with a host database node cluster of a host, a host database at least initially undiscovered by the backup node cluster, one or more processors coupled with memory storing instructions that, when executed, perform operations comprising at least installing a backup agent on at least one node of the host database node cluster, registering the host at the backup service, based on the host registration, triggering a host database discovery process to discover the undiscovered database automatically, the discovery process including a discovery call, in response to the discovery call, receiving metadata relating to the discovered database, and communicating with the discovered database.

18 Claims, 10 Drawing Sheets

(56) References Cited

OTHER PUBLICATIONS

"U.S. Appl. No. 16/728,458, Response filed Jan. 12, 2022 to Non Final Office Action dated Dec. 15, 2021", 10 pgs
"U.S. Appl. No. 16/728,458, Examiner Interview Summary dated Jan. 19, 2022", 2 pgs.
"U.S. Appl. No. 16/728,494, Non Final Office Action dated Feb. 1, 2022", 12 pgs.
Rubrik, "Reference Architecture Rubrik and VMware VSphere", [Online] Retrieved from the internethttps www.rubrik.com content dam rubrik en resources white-paper reference-architecture-Rubrik-and-VMware-vSphere.pdf, (Jul. 2018), 44 pgs.

* cited by examiner

AUTOMATED DISCOVERY OF DATABASES

FIELD

The present disclosure relates generally to computer architecture software for a data management platform and, in some more particular aspects, to automated discovery of databases.

BACKGROUND

Large databases, such as Oracle™ databases, are commonly used in business-critical applications. It is typical for enterprises to have a large number of these databases provisioned and running in one or more datacenters. In order to be protected by a backup system, for example, a database needs to be detected. Typically, detection of a database by a backup system and registration of it in the data backup system is performed substantially manually. This procedure may be error-prone and inefficient.

The sheer volume and complexity of data that is collected, analyzed and stored is increasing rapidly over time. The computer infrastructure used to handle this data is also becoming more complex, with more processing power and more portability. As a result, data management and storage is becoming increasingly important. Significant needs of these processes include access to reliable data backup and storage, and fast data recovery in cases of failure. Other aspects include data portability across locations and platforms. The present disclosure seeks to address at least these issues.

SUMMARY

In some examples, a networked computing system comprises a backup node cluster of a backup service in communication with a host database node cluster of a host; a host database at least initially undiscovered by the backup node cluster; one or more processors coupled with memory storing instructions that, when executed, perform operations comprising at least: installing a backup agent on at least one node of the host database node cluster; registering the host at the backup service; based on the host registration, triggering a host database discovery process to discover the undiscovered database automatically, the discovery process including a discovery call; in response to the discovery call; receiving metadata relating to the discovered database; and communicating with the discovered database.

In some examples, a networked computing system comprises a backup node cluster of a backup service in communication with a host database node cluster of a host; a host database at least initially undiscovered by the backup node cluster; one or more processors coupled with memory storing instructions that, when executed, perform operations comprising at least: installing a backup agent on at least one node of the host database node cluster, the backup agent communicating with at least one node of the backup node cluster; registering the host at the backup service; triggering, based on a host registration, an automatic host database discovery process to discover the undiscovered database; receiving metadata relating to the discovered database; and communicating with the discovered database.

In some examples, a networked computing system comprises a backup node cluster of a backup service; a host database node cluster of a host; a host database at least initially undiscovered by the backup node cluster; one or more processors coupled with memory storing instructions that, when executed, perform operations comprising at least: installing a backup agent on at least one node of the host database node cluster, the backup agent communicating with at least one node of the backup node cluster; registering the host at the backup service, the registering including receiving a communication from the installed backup agent and connecting the backup node cluster to the host database node cluster; triggering, based on a host registration, an automatic host database discovery process to discover the undiscovered database; accessing metadata relating to the discovered database; and communicating with the discovered database.

In some examples, the operations further comprise installing the backup agent on each of the nodes of the host database node cluster.

In some examples, the backup agent is associated with the backup service or a data management platform.

In some examples, the host database is one of an Oracle, Linux, or AIX database and wherein the backup agent is supported to run on the host database.

In some examples, the host database node cluster includes a Real Application Cluster (RAC).

In some examples, the operations further comprise displaying the received metadata on a user interface.

DESCRIPTION OF THE DRAWINGS

Some embodiments are illustrated by way of example and not limitation in the figures of the accompanying drawings.

DESCRIPTION

Figure 1:
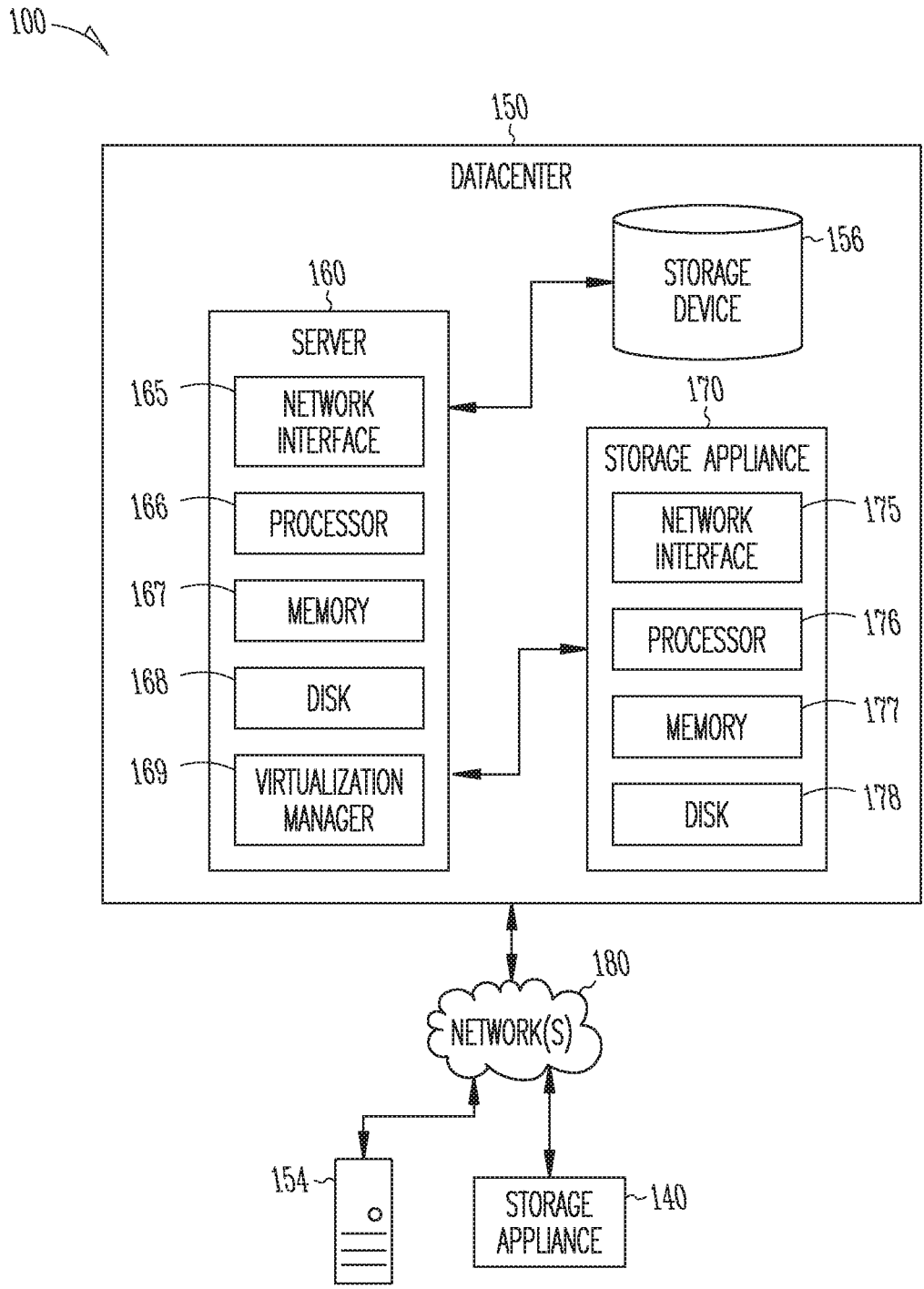
FIG. 1 depicts one embodiment of a networked computing environment 100 in which the disclosed technology may be practiced, according to an example embodiment.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present invention may be practiced without these specific details.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Rubrik, Inc., 2018-2019, All Rights Reserved.

It will be appreciated that some of the examples disclosed herein are described in the context of virtual machines that are backed up by using base and incremental snapshots, for example. This should not necessarily be regarded as limiting of the disclosures. The disclosures, systems and methods described herein apply not only to virtual machines of all types that run a file system (for example), but also NAS devices, physical machines (for example Linux servers), and databases.

FIG. 1 depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may also include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The storage appliance 170 may include a data management system for backing up virtual machines and/or files within a virtualized infrastructure. The server 160 may be used to create and manage one or more virtual machines associated with a virtualized infrastructure.

The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a Networked-Attached Storage (NAS) device. In some cases, a data center, such as data center 150, may include thousands of servers and/or data storage devices in communication with each other. The one or more data storage devices 156 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server or to perform a search query related to particular information stored on the server. In some cases, a server may act as an application server or a file server. In general, a server 160 may refer to a hardware device that acts as the host in a client-server relationship or a software process that shares a resource with or performs work for one or more clients.

One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine having a virtual disk into a frozen state in response to a snapshot request made via an application programming interface (API) by a storage appliance, such as storage appliance 170. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 169 may then transfer data associated with the virtual machine (e.g., an image of the virtual machine or a portion of the image of the virtual disk file associated with the state of the virtual disk at the point in time is frozen) to a storage appliance (for example, a storage appliance 140 or 170 of FIG. 1, described further below) in response to a request made by the storage appliance. After the data associated with the point in time snapshot of the virtual machine has been transferred to the storage appliance 170 (for example), the virtual machine may be released from the frozen state (i.e., unfrozen) and the updates made to the virtual machine and stored in the separate file may be merged into the virtual disk file. The virtualization manager 169 may perform various virtual machine related tasks, such as cloning virtual machines, creating new virtual machines, monitoring the state of virtual machines, moving virtual machines between physical hosts for load balancing purposes, and facilitating backups of virtual machines.

One embodiment of a storage appliance 170 (or 140) includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different points in time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 154. The storage appliance 140 may comprise a cloud-based data management system for backing up virtual machines and/or files within a virtualized infrastructure, such as virtual machines running on server 160 or files stored on server 160.

In some cases, networked computing environment 100 may provide remote access to secure applications and files stored within data center 150 from a remote computing device, such as computing device 154. The data center 150 may use an access control application to manage remote access to protected resources, such as protected applications, databases, or files located within the data center. To facilitate remote access to secure applications and files, a secure network connection may be established using a virtual private network (VPN), A VPN connection may allow a remote computing device, such as computing device 154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface)

that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 170 may run an NFS server and make the particular version (or a copy of the particular version) of the virtual machine accessible for reading and/or writing. The end user of the storage appliance 170 may then select the particular version to be mounted and run an application (e.g., a data analytics application) using the mounted version of the virtual machine. In another example, the particular version may be mounted as an iSCSI target.

Figure 2:
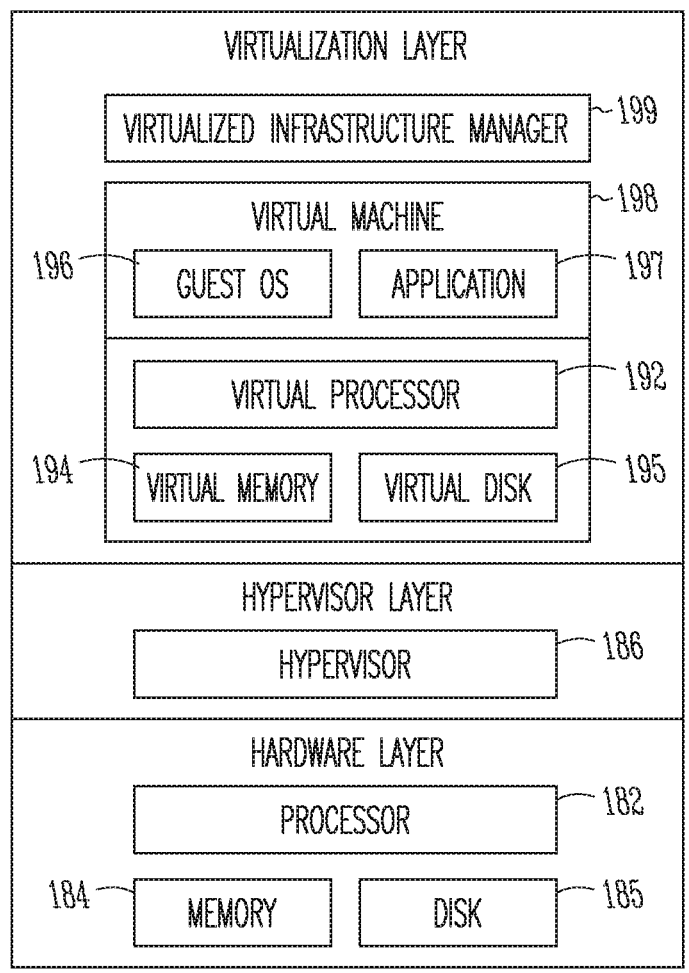
FIG. 2 depicts one embodiment of server 160 in FIG. 1, according to an example embodiment.

FIG. 2 depicts one embodiment of server 160 in FIG. 1. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine 198 may include a plurality of virtual disks 195, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1, may run on a virtual machine or natively on the server 160. The virtual machine may, for example, be or include the virtual machine 198 or a virtual machine separate from the server 160. Other arrangements are possible. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure related tasks, such as cloning virtual machines, creating new virtual machines, monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1 or storage appliance 170 in FIG. 1, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance 140 or 170 of FIG. 1 or a plurality of data blocks corresponding with the full image (e.g., to enable a frill image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 may or the hypervisor 186 may communicate with a storage appliance, such as storage appliance 140 in FIG. 1 or storage appliance 170 in FIG. 1, using a distributed file system protocol such as Network File System (NFS) Version 3, or Server Message Block (SMB) protocol. The distributed file system protocol may allow the server 160 or the hypervisor 186 to access, read, write, or modify files stored on the storage appliance as if the files were locally stored on the server. The distributed file system protocol may allow the server 160 or the hypervisor 186 to mount a directory or a portion of a file system located within the storage appliance.

Figure 3:
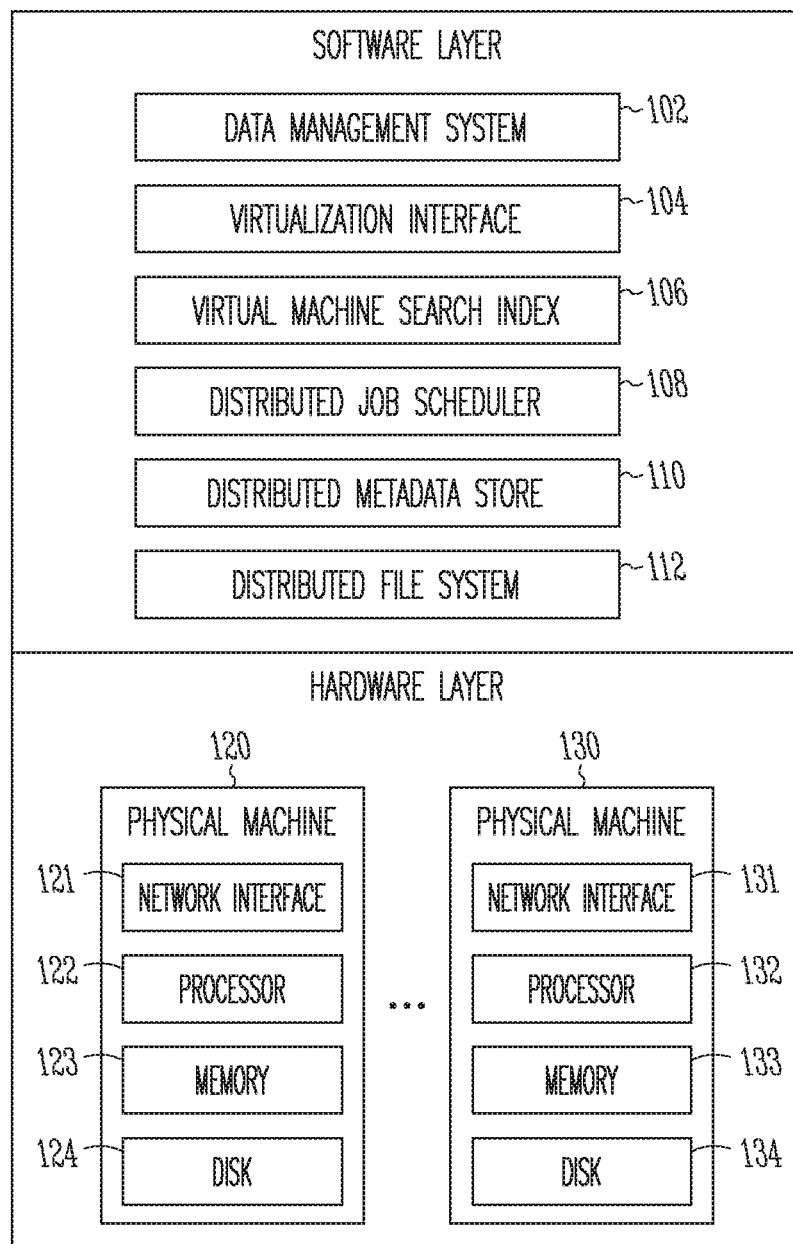
FIG. 3 depicts one embodiment of storage appliance 170 in FIG. 1, according to an example embodiment.

FIG. 3 depicts one embodiment of storage appliance 170 in FIG. 1. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 108 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1, or a hypervisor, such as hypervisor 186 in FIG. 2, to communicate with the storage appliance 170 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 2 may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of nodeG may be G-i) modulo N. In another example, given a number (N) of nodes in a cluster from node(0) to node(N−1), for a floating IP address (i), the VRRP priority of nodeG may be (i-j) modulo N. In these cases, nodeG will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating 1P address associated with a third node in the cluster.

As depicted in FIG. 3, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks or shards. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document-oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this case, only a single full image needs to be stored and each version of the virtual machine may be generated from the single full image or the single full image combined with a subset of the one or more incremental aspects. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be executed on a particular node in a cluster based on the location of data required to be accessed by the one or more tasks.

In one embodiment, the distributed job scheduler 108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 199 in FIG. 2, to create a frozen copy of the virtual machine and to transfer one or more chunks (or one or more files) associated with the frozen copy to a storage appliance, such as storage appliance 170 in FIG. 1. The one or more tasks may also include generating metadata for the one or more chunks, storing the metadata using the distributed metadata store 110, storing the one or more chunks within the distributed file system 112, and communicating with the virtualized infrastructure manager 199 that the frozen copy of the virtual machine may be unfrozen or released for a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 92 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 104 may provide an interface for communicating with a virtualized infrastructure manager managing a virtualization infrastructure, such as virtualized infrastructure manager 199 in FIG. 2, and requesting data associated with virtual machine snapshots from the virtualization infrastructure. The virtualization interface 104 may communicate with the virtualized infrastructure manager using an Application Programming Interface (API) for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that include the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one embodiment, as each snapshot of a virtual machine is ingested each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog, and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 3.

The data management system 102 may comprise an application running on the storage appliance that manages and stores one or more snapshots of a virtual machine. In one example, the data management system 102 may comprise a highest-level layer in an integrated software stack running on the storage appliance. The integrated software stack may include the data management system 102, the virtualization interface 104, the distributed job scheduler 108, the distributed metadata store 110, and the distributed file system 112.

In some cases, the integrated software stack may run on other computing devices, such as a server or computing device 154 in FIG. 1. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

Figure 4:
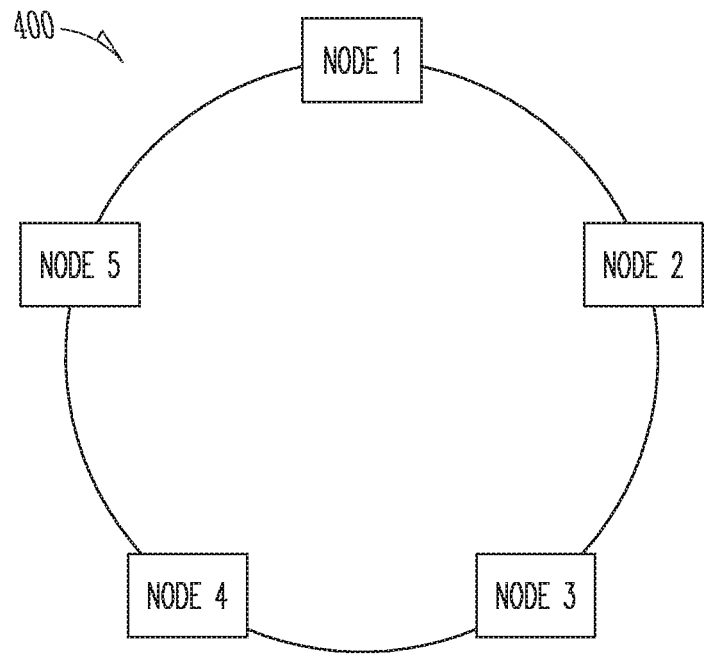
FIG. 4 shows an example cluster of a distributed decentralized database, according to some example embodiments.

FIG. 4 shows an example cluster 200 of a distributed decentralized database, according to some example embodiments. As illustrated, the example cluster 200 includes five nodes, nodes 1-5. In some example embodiments, each of the five nodes runs from different machines, such as physical machine 120 in FIG. 1C or virtual machine 198 in FIG. 1B. The nodes in the cluster 200 can include instances of peer nodes of a distributed database (e.g., cluster-based database, distributed decentralized database management system, a NoSQL, database, Apache Cassandra, DataStax, MongoDB, CouchDB), according to some example embodiments. The distributed database system is distributed in that data is sharded or distributed across the cluster 200 in shards or chunks and decentralized in that there is no central storage device and there no single point of failure. The system operates under an assumption that multiple nodes may go down, up, or become non-responsive, and so-on. Sharding is splitting up of the data horizontally and managing each separately on different nodes. For example, if the data managed by the cluster 200 can be indexed using the 26 letters of the alphabet, node 1 can manage a first shard that handles records that start with A through E, node 2 can manage a second shard that handles records that start with F through J, and so on.

In some example embodiments, data written to one of the nodes is replicated to one or more other nodes per a replication protocol of the cluster 200. For example, data written to node 1 can be replicated to nodes 2 and 3. If node 1 prematurely terminates, node 2 and/or 3 can be used to provide the replicated data. In some example embodiments, each node of cluster 200 frequently exchanges state information about itself and other nodes across the cluster 200 using gossip protocol. Gossip protocol is a peer-to-peer communication protocol in which each node randomly shares (e.g., communicates, requests, transmits) location and state information about the other nodes in a given cluster.

Writing: For a given node, a sequentially written commit log captures the write activity to ensure data durability. The data is then written to an in-memory structure (e.g., a memtable, write-back cache). Each time the in-memory structure is full, the data is written to disk in a Sorted String Table data file. In some example embodiments, writes are automatically partitioned and replicated throughout the cluster 200.

Reading: Any node of cluster 200 can receive a read request (e.g., query) from an external client. If the node that receives the read request manages the data requested, the node provides the requested data. If the node does not manage the data, the node determines which node manages the requested data. The node that received the read request then acts as a proxy between the requesting entity and the node that manages the data (e.g., the node that manages the data sends the data to the proxy node, which then provides the data to an external entity that generated the request).

The distributed decentralized database system is decentralized in that there is no single point of failure due to the nodes being symmetrical and seamlessly replaceable. For example, whereas conventional distributed data implementations have nodes with different functions (e.g., master/slave nodes, asymmetrical database nodes, federated databases), the nodes of cluster 200 are configured to function the same way (e.g., as symmetrical peer database nodes that communicate via gossip protocol, such as Cassandra nodes) with no single point of failure. If one of the nodes in cluster 200 terminates prematurely ("goes down"), another node can rapidly take the place of the terminated node without disrupting service. The cluster 200 can be a container for a keyspace, which is a container for data in the distributed decentralized database system whereas a database is a container for containers in conventional relational databases, the Cassandra keyspace is a container for a Cassandra database system).

As mentioned above, large databases, such as Oracle™ databases are commonly used in business-critical applications. It is typical for enterprises to have a large number of these databases provisioned and running in their datacenter. The databases may operate or be accessible at a remote host and include a host database node cluster. In some present examples, in order to protect these databases at scale, the databases can be discovered automatically irrespective of the underlying platform. Once discovered, a user (for example, an administrator) can establish or implement one or more security or backup protocols, such as Service Level agreements (SLAs) to protect a full set of the databases thus discovered. A backup protocol may include utilization by a host of an "Oracle snappable" (or database snapshot) product that is able to back up database or production data in the manner described herein with reference to FIGS. 1-4 herein.

Figure 5:
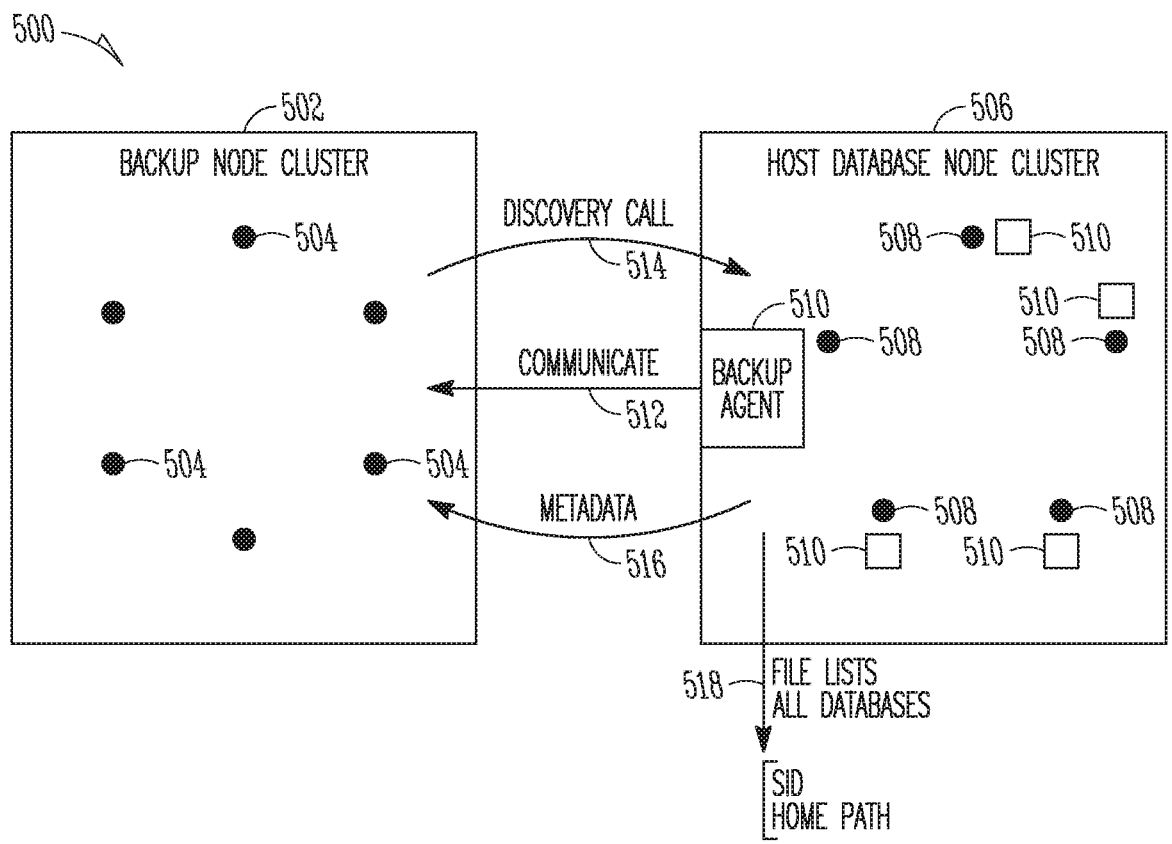
FIG. 5 depicts an example networked computer system, according to an example embodiment.

With reference to FIG. 5, an example networked computing system 500 includes a backup node cluster 502 of nodes 504 and a host database node cluster 506 of nodes 508. In some examples, an automated discovery of databases at the host (such as Oracle™ databases) is performed using a backup agent 510. The backup agent 510 communicates at 512 with the nodes 504 in the backup node cluster 502. The backup agent 510 may be supplied by or associated with a data management platform, a storage appliance 170 (FIG. 1 and FIG. 3), or a backup facility such as Rubrik, Inc. of California. An example backup agent 510 may include or be constituted by a Rubrik Backup Agent (RBA). Other backup agents are possible. A backup agent may be supported for databases running on a given platform. For example, an RBA is currently supported for databases running on Linux and AIX platforms.

In an initial or early operation for automated database discovery, the backup agent 510 is installed on the database server nodes 508 in the host database node cluster 506. In some examples, the database server nodes 508 are provided in a cluster of nodes such as a cluster of nodes described elsewhere herein, or in a cluster of nodes 200 as illustrated and described with reference to FIG. 4 hereof. An example cluster 506 may include a Real Application Cluster (RAC), in the case of an RAC, some embodiments of this disclosure include the installation of a backup agent 510 at each of the cluster nodes of 508.

Once the backup agents 510 have been installed, the one or more databases at the host are discovered when the host is registered and metadata relating to the discovered databases is rendered accessible. In some examples, the metadata of the discovered databases is displayed on a user interface. In some examples, the database metadata is refreshed periodically when the host metadata is refreshed. In such examples, very little or no manual database detection or registration is required. Errors introduced by a manual process are avoided, or at least minimized.

As part of an example host registration process, the host cluster 506 is then added (connected) to the backup node cluster 502 using a user interface or rest API. The host cluster addition triggers a host database discovery process that includes, in some examples, a host discovery request call 514. In some examples, the database discovery phase is performed synchronously during the host registration process.

Once the installed backup agent 510 receives such a discovery request 514, a database is discovered by connecting to the database using a call interface, such as Oracle™ Call Interface (OCI). OCI is a comprehensive, high performance, native C language interface for Oracle™ databases for custom or packaged applications. Some example backup agents 510, such as an RBA, are written in C++ machine language and include custom interfaces adapted to use standard OCI. A differentiator in some examples is that such custom interfaces abstract out multiple OCI calls and simplify the process of connecting to and querying a database. In some examples, a C++ OCI requires user credentials. In some examples, a custom interface is written in, or includes a "wrapper" based on, C machine language and can connect to an Oracle™ database without the need for user credentials from the database host or requiring host or user intervention. In some examples, a wrapper still requires specification of a username, but not a password. In these examples, a password is not required.

Thus, in some examples, databases may be automatically discovered using a less privileged or non SYSDBA user. Typically, SYSDBA and SYSOPER are administrative privileges required to perform high-level administrative operations such as creating, starting up, shutting down, backing up, or recovering a database.

In some embodiments, a database is discovered by running queries using an SYSDBA user (or DBA user) by default. Some hosts include auditing procedures which track queries run by system users. If a backup administrator agent logs in to the host as a system user, the host is unable to distinguish between queries run by the backup administrator and queries run by a DBA user as the sys user. To enable host users to distinguish between backup and DBA logins, some embodiments may allow users to provide a lower privileged user to run queries for discovery and backup. All these queries may be recorded in some examples as having run as the specific lower privileged user provided by the customer.

In order to connect to a discovered database, the instance security identifier (SID) and the Oracle™ home path is accessed or provided at 518. A list of databases to connect to may be determined by identifying a set of all process monitoring (pmon) running on the host. An output of this process identification may include the instance SID of each database and the prison process identifier (id). Given a pmon process id, a symbolic link (path file, or symlink) to the current working directory can be found. The symlink may be found, for example, under a/proc filesystem used to present process information and kernel processes. An Oracle™ home path can be derived as the parent directory of the current working directory. In the case where there are no pmon processes running, the presence of an oratab file may be required to identify the host as an Oracle™ host. An oratab is a colon-delimited text file on Unix and Linux systems that associates ORACLE_SID and ORACLE_HOME values.

Once a database has been discovered and connected, one or more queries may be run against it to determine its properties. Such properties may include database name, SID, locations of various files such as SPHLE, Control file, and datafiles. Other queries are possible. One or more commands may also be run to discover the host or RAC properties. This property information and file metadata may be returned at 116 to the backup node cluster 502 and populated in metadata tables. Databases may be added or removed periodically or in real time based on their discovery (or lack thereof) or based on data or changes in the returned metadata.

Figure 6:
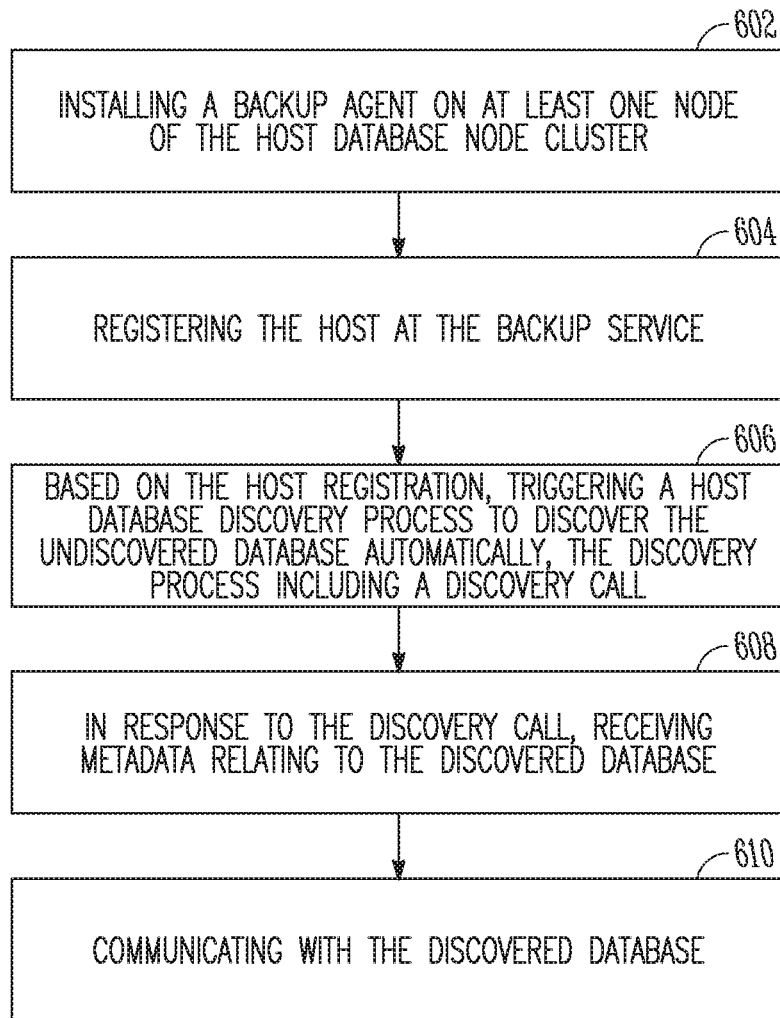
FIGS. 6-8 each depict a block flow chart indicating example operations in a method, according to example embodiments.

With reference to FIG. 6, certain operations in an example computer-implemented method 600 at a networked computing system our provided. In some examples, the networked computer system comprises a backup node cluster of a backup service in communication with a host database node cluster of a host and a host database at least initially undiscovered by the backup node cluster. The example method 600 may comprise operations including at least: at 602; installing a backup agent on at least one node of the host database node cluster; at 604, registering the host at the backup service; at 606, based on the host registration, triggering a host database discovery process to discover the undiscovered database automatically, the discovery process including a discovery call; at 608, in response to the discovery call, receiving metadata relating to the discovered database; and, at 610, communicating with the discovered database.

Figure 7:
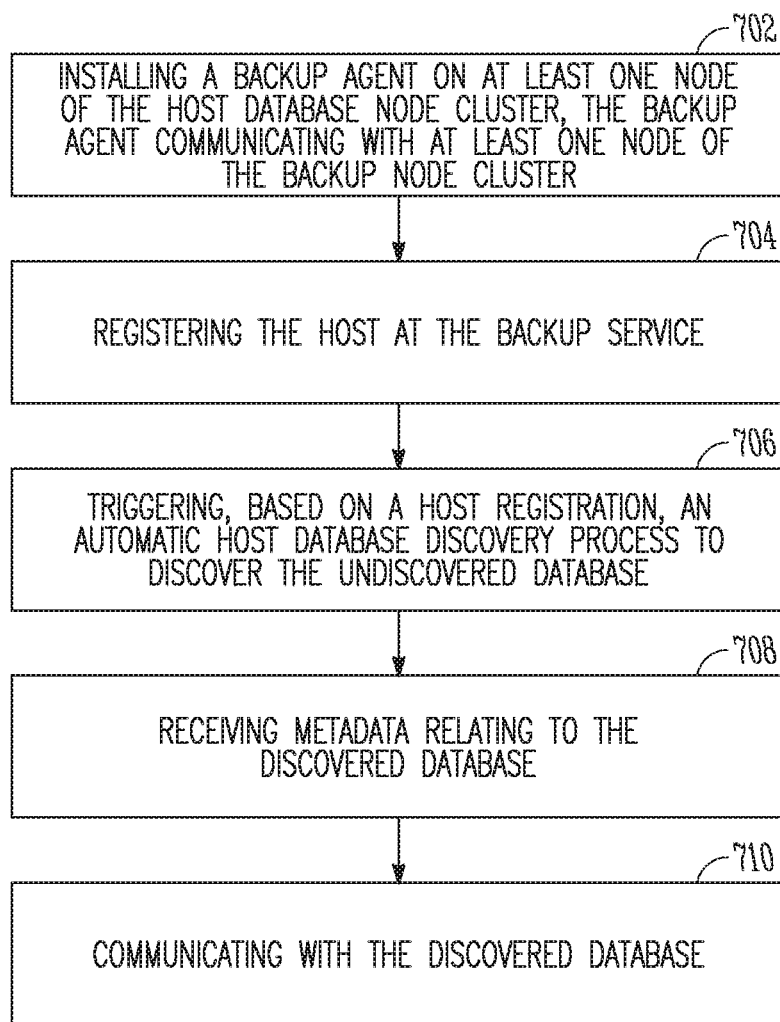

With reference to FIG. 7, certain operations in an example computer-implemented method 700 at a networked computing system our provided. In some examples, the networked computer system comprises a backup node cluster of a backup service in communication with a host database node cluster of a host and a host database at least initially undiscovered by the backup node cluster. The example method 700 may comprise operations including at least: at 702, installing a backup agent on at least one node of the host database node cluster, the backup agent communicating with at least one node of the backup node cluster; at 704, registering the host at the backup service; at 706, triggering, based on a host registration, an automatic host database discovery process to discover the undiscovered database; at 708, receiving metadata relating to the discovered database; and; at 710, communicating with the discovered database.

Figure 8:
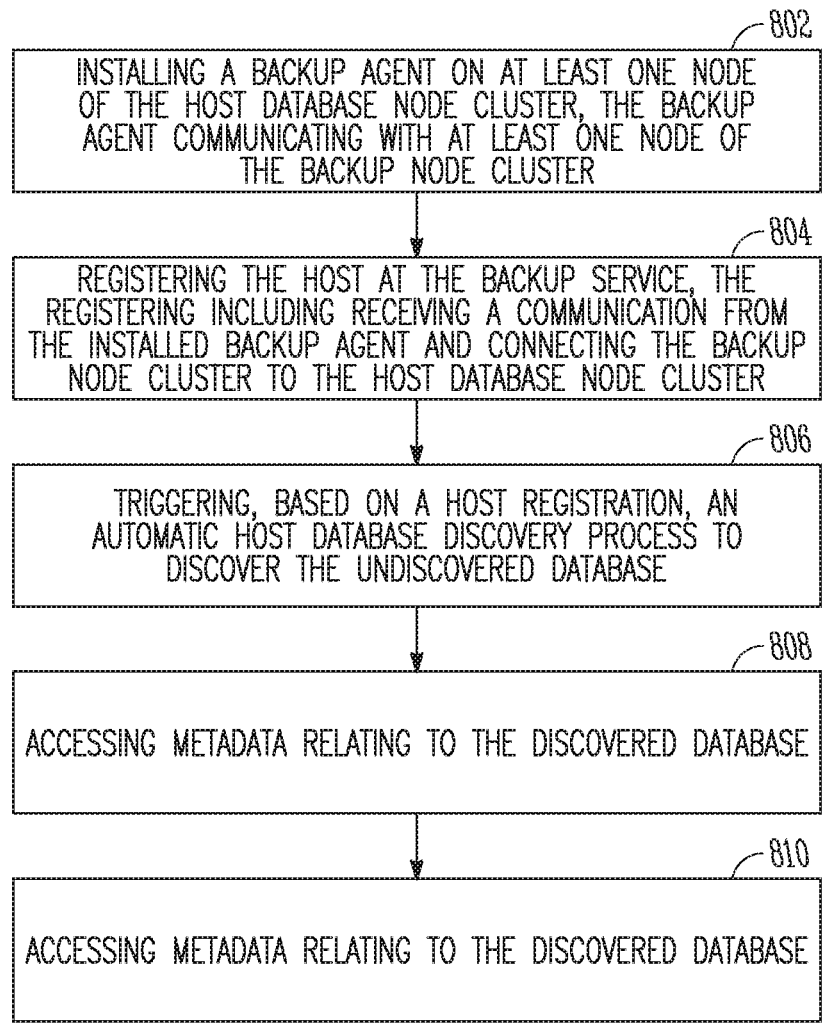

With reference to FIG. 8, certain operations in an example computer-implemented method 800 at a networked computing system our provided. In some examples, the networked computer system comprises a backup node cluster of a backup service in communication with a host database node cluster of a host and a host database at least initially undiscovered by the backup node cluster. The example method 800 may comprise operations including at least: at 802, installing a backup agent on at least one node of the host database node cluster; the backup agent communicating with at least one node of the backup node cluster; at 804, registering the host at the backup service; the registering including receiving a communication from the installed backup agent and connecting the backup node cluster to the host database node cluster; at 806, triggering, based on a host registration, an automatic host database discovery process to discover the undiscovered database; at 808, accessing metadata relating to the discovered database; and, at 810, communicating with the discovered database.

In some examples, the operations further comprise installing the backup agent on each of the nodes of the host database node cluster.

In some examples, the backup agent is associated with the backup service or a data management platform.

In some examples, the host database is one of an Oracle, Linux, or AIX database and wherein the backup agent is supported to run on the host database.

In some examples, the host database node cluster includes a Real Application Cluster (RAC).

In some examples, the operations further comprise displaying the received metadata on a user interface.

Further example operations in the methods 600, 700, and 800 may include further or alternate operations described elsewhere herein.

Further examples may include a non-transitory, machine-readable medium storing instructions which, when read by a machine, cause the machine to perform operations in a method at a data management platform, the data management platform including a storage device configured to store secondary data, the operations comprising at least those included in methods 600, 700, and 700, as well as those summarized above or described elsewhere herein.

Figure 9:
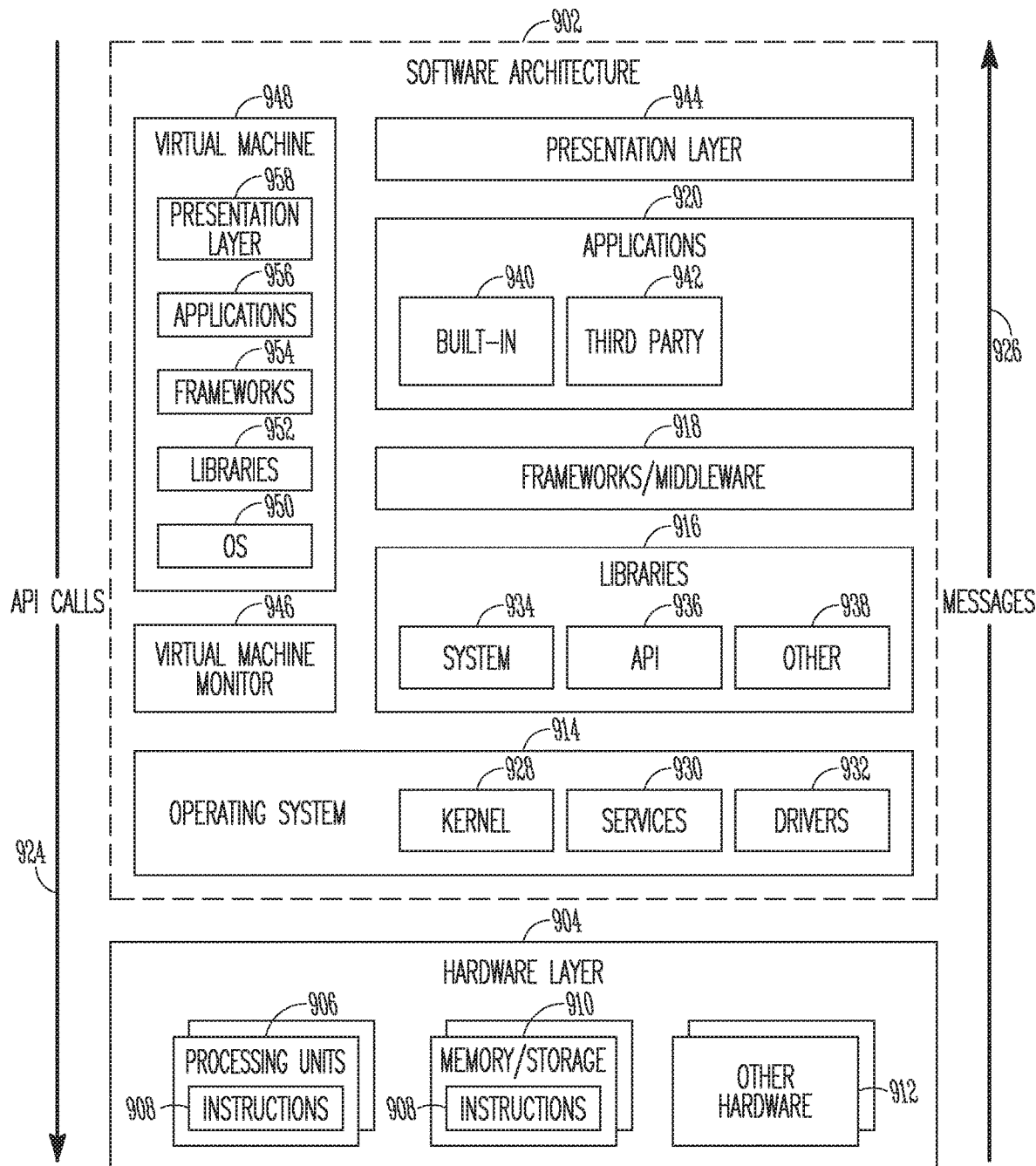
FIG. 9 depicts a block diagram illustrating an example of a software architecture that may be installed on a machine, according to some example embodiments.

FIG. 9 is a block diagram illustrating an example of a computer software architecture for data classification and information security that may be installed on a machine, according to some example embodiments. FIG. 9 is merely a non-limiting example of a software architecture, and it will be appreciated that many other architectures may be implemented to facilitate the functionality, described herein. The software architecture 902 may be executing on hardware such as a machine 1100 of FIGS. 10-11 that includes, among other things, processors 1110, memory 1130, and I/O components 1150. A representative hardware layer 904 of FIG. 9 is illustrated and can represent, for example, the machine 1000 of FIG. 10. The representative hardware layer 904 of FIG. 9 comprises one or more processing units 906 having associated executable instructions 908. The executable instructions 908 represent the executable instructions of the software architecture 902, including implementation of the methods, modules, and so forth described herein. The hardware layer 904 also includes memory or storage modules 910, which also have the executable instructions 908. The hardware layer 904 may also comprise other hardware 912, which represents any other hardware of the hardware layer 904, such as the other hardware illustrated as part of the machine 900.

In the example architecture of FIG. 9, the software architecture 902 may be conceptualized as a stack of layers, where each layer provides particular functionality. For example, the software architecture 902 may include layers such as an operating system 914, libraries 916, frameworks/middleware 918, applications 920, and a presentation layer 944. Operationally, the applications 920 or other components within the layers may invoke API calls 924 through the software stack and receive a response, returned values, and so forth (illustrated as messages 926) in response to the API calls 924. The layers illustrated are representative in nature, and not all software architectures have all layers. For example, some mobile or special purpose operating systems may not provide a frameworks/middleware 918 layer, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than by interfacing directly with the underlying operating system 914 functionality (e.g., kernel 928, services 930, or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a home application, a contacts application, a browser application, a book reader application, a location application, a media application, a messaging application, or a game application.

The third-party applications 942 may include any of the built-in applications 940, as well as a broad assortment of other applications. In a specific example, the third-party applications 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party applications 942 may invoke the API calls 924 provided by the mobile operating system such as the operating system 914 to facilitate functionality described herein.

The applications 920 may utilize built-in operating system functions (e.g., kernel 928, services 930, or drivers 932), libraries (e.g., system 934, APIs 936, and other libraries 938), or frameworks/middleware 918 to create user interfaces to interact with users of the system. Alternatively, or additionally, in some systems, interactions with a user may occur through a presentation layer, such as the presentation layer 944. In these systems, the application/module "logic" can be separated from the aspects of the application/module that interact with the user.

Some software architectures utilize virtual machines. In the example of FIG. 9, this is illustrated by a virtual machine 948. A virtual machine creates a software environment where applications/modules can execute as if they, were executing on a hardware machine e.g., the machine 1000 of FIG. 10, for example). A virtual machine 948 is hosted by a host operating system (e.g., operating system 914) and typically, although not always, has a virtual machine monitor 946, which manages the operation of the virtual machine 948 as well as the interface with the host operating system (e.g., operating system 914). A software architecture executes within the virtual machine 948, such as an operating system 950, libraries 952, frameworks/middleware 954, applications 956, or a presentation layer 958. These layers of software architecture executing within the virtual machine 948 can be the same as corresponding layers previously described or may be different.

Figure 10:
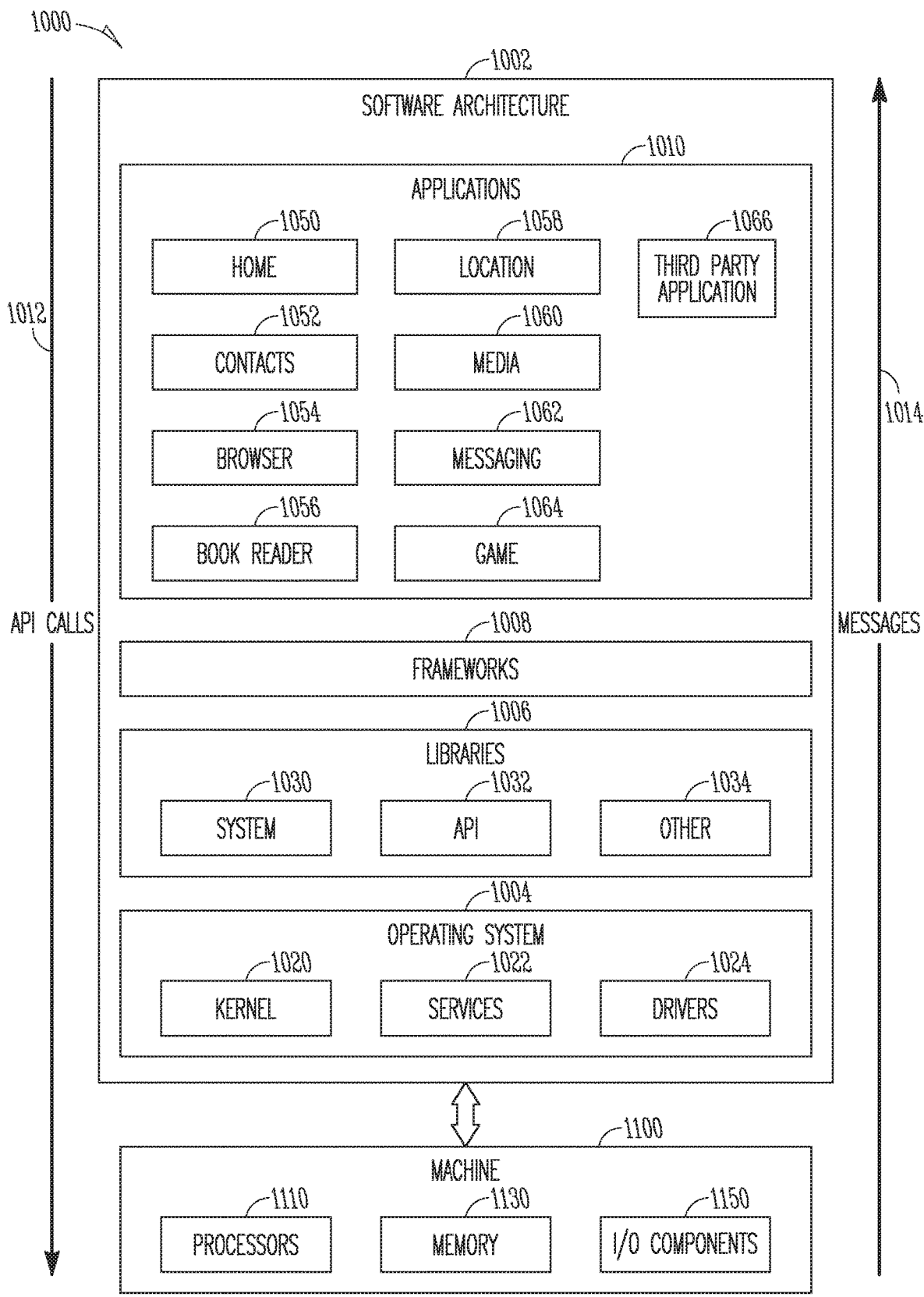
FIG. 10 depicts a block diagram 1000 illustrating an architecture of software 902, according to an example embodiment.

FIG. 10 is a block diagram 1000 illustrating an architecture of software 1002, which can be installed on any one or more of the devices described above. FIG. 10 is merely a non-limiting example of a software architecture, and it will be appreciated that many other architectures can be implemented to facilitate the functionality described herein. In various embodiments, the software 1002 is implemented by hardware such as a machine 1100 of FIG. 11 that includes processors 1110, memory 1130, and I/O components 1150. In this example architecture, the software 1002 can be conceptualized as a stack of layers where each layer may provide a particular functionality. For example, the software 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers. BLUETOOTH® or BLUETOOTH® Low Energy drivers, flash memory drivers, serial communication drivers (e.g., Universal Serial Bus (USB) drivers), WI-FIR drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1010 provided by the operating system 1004 to facilitate functionality described herein.

Figure 11:
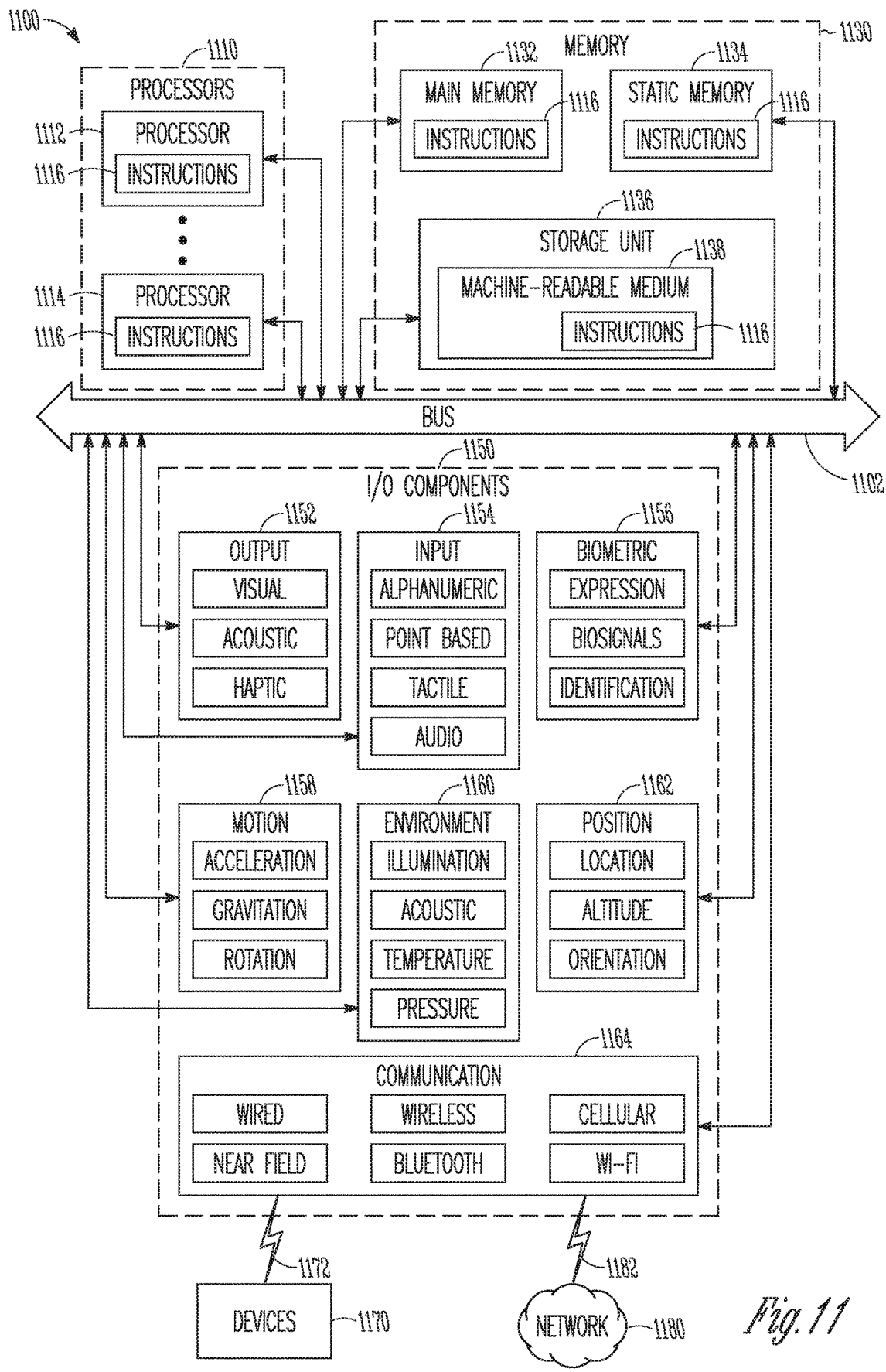
FIG. 11 illustrates a diagrammatic representation of a machine 1000 in the form of a computer system within which a set of instructions may be executed for causing a machine to perform any one or more of the methodologies discussed herein, according to an example embodiment.

FIG. 11 illustrates a diagrammatic representation of a machine 1100 in the form of a computer system within which a set of instructions may be executed for causing the machine to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. Additionally, or alternatively, the instructions 1116 may implement the operations of the methods shown in FIGS. 5-7, or as elsewhere described herein.

The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (WIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 may include a main memory 1132, a static memory 1134, and a storage unit 1136, each accessible to the processors 1110 such as via the bus 1102. The main memory 1130, the static memory 1134, and storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

The various memories (i.e., 1130, 1132, 1134, and/or memory of the processor(s) 1110) and/or storage unit 1136 may store one or more sets of instructions and data structures (e.g., software) embodying or utilized by any one or more of the methodologies or functions described herein. These instructions (e.g., the instructions 1116), when executed by processor(s) 1110, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a VPN, a LAN; a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A networked computing system comprising:
   a backup node cluster of a backup service in communication with a host database node cluster of a host;
   a host database at least initially undiscovered by the backup node cluster;
   one or more processors coupled with memory storing instructions that, when executed, perform operations comprising at least:
   installing a backup agent on at least one node of the host database node cluster;
   registering the host at the backup service;
   based on the host registration, triggering a host database discovery process to discover the undiscovered database automatically, the discovery process including a discovery call;
   in response to the discovery call, receiving metadata relating to the discovered database; and
   communicating with the discovered database.

2. The networked computing system of claim 1, wherein the operations further comprise installing the backup agent on each node of the host database node cluster.

3. The networked computing system of claim 1, wherein the backup agent is associated with the backup service or a data management platform.

4. The networked computing system of claim 1, wherein the host database is one of an Oracle, Linux, or AIX database and wherein the backup agent is supported to run on the host database.

5. The networked computing system of claim 1, wherein the host database node cluster includes a Real Application Cluster (RAC).

6. The networked computing system of claim 1, wherein the operations further comprise displaying the received metadata on a user interface.

7. A method at a networked computing system comprising a backup node cluster of a backup service in communication with a host database node cluster of a host and a host database at least initially undiscovered by the backup node cluster, the method comprising operations including at least:
   installing a backup agent on at least one node of the host database node cluster;
   registering the host at the backup service;
   based on the host registration, triggering a host database discovery process to discover the undiscovered database automatically, the discovery process including a discovery call;
   in response to the discovery call, receiving metadata relating to the discovered database; and
   communicating with the discovered database.

8. The method of claim 7, wherein the operations further comprise installing the backup agent on each node of the host database node cluster.

9. The method of claim 7, wherein the backup agent is associated with the backup service or a data management platform.

10. The method of claim 7, wherein the host database is one of an Oracle, Linux, or AIX database and wherein the backup agent is supported to run on the host database.

11. The method of claim 7, wherein the host database node cluster includes a Real Application Cluster (RAC).

12. The method of claim 7, wherein the operations further comprise displaying the received metadata on a user interface.

13. A non-transitory machine-readable medium including instructions, which when read by a machine, because the machine to perform operations at a networked computing system comprising a backup node cluster of a backup service in communication with a host database node duster of a host and a host database at least initially undiscovered by the backup node cluster, the operations including at least:
   installing a backup agent on at least one node of the host database node cluster;
   registering the host at the backup service;
   based on the host registration, triggering a host database discovery process to discover the undiscovered database automatically, the discovery process including a discovery call;
   in response to the discovery call, receiving metadata relating to the discovered database; and
   communicating with the discovered database.

14. The medium of claim 13, wherein the operations further comprise installing the backup agent on each node of the host database node cluster.

15. The medium of claim 13, wherein the backup agent is associated with the backup service or a data management platform.

16. The medium of claim 13, wherein the host database is one of an Oracle, Linux, or AIX database and wherein the backup agent is supported to run on the host database.

17. The medium of claim 13, wherein the host database node duster includes a Real Application Cluster (RAC).

18. The medium of claim 13, wherein the operations further comprise displaying the received metadata on a user interface.

* * * * *